United States Patent
Adams et al.

(10) Patent No.: US 11,734,001 B2
(45) Date of Patent: *Aug. 22, 2023

(54) SOFTWARE DEVELOPMENT WORKBENCH

(71) Applicant: JPMorgan Chase Bank, N.A., New York, NY (US)

(72) Inventors: Duncan Adams, Keysoe (GB); Alex Hayzelden, Chigwell (GB); Tanmay Madan, London (GB); Matthew Gardner, Southampton (GB); Andrew J. Muller, Newark, DE (US); Stephen Flaherty, Glasgow (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 242 days.

This patent is subject to a terminal disclaimer.

(21) Appl. No.: 17/126,640

(22) Filed: Dec. 18, 2020

(65) Prior Publication Data

US 2021/0103442 A1 Apr. 8, 2021

Related U.S. Application Data

(63) Continuation of application No. 16/410,033, filed on May 13, 2019, now Pat. No. 10,901,731.

(60) Provisional application No. 62/670,444, filed on May 11, 2018.

(51) Int. Cl.
G06F 8/77 (2018.01)
(52) U.S. Cl.
CPC .................................. *G06F 8/77* (2013.01)

(58) Field of Classification Search
CPC ............................... G06F 8/00–34; G06F 8/77
See application file for complete search history.

(56) References Cited

U.S. PATENT DOCUMENTS

| | | | |
|---|---|---|---|
| 7,509,244 B1 * | 3/2009 | Shakeri | G06F 8/41 717/109 |
| 8,037,453 B1 | 10/2011 | Zawadzki | |
| 8,819,617 B1 | 8/2014 | Koenig et al. | |
| 9,454,351 B2 * | 9/2016 | Anderson | G06F 9/4411 |
| 9,916,133 B2 * | 3/2018 | Jubran | G06F 8/77 |
| 2008/0189681 A1 | 8/2008 | Bhogal et al. | |
| 2009/0327996 A1 | 12/2009 | Siegemund et al. | |
| 2010/0162215 A1 * | 6/2010 | Purcell | G06F 8/77 717/127 |
| 2011/0161912 A1 | 6/2011 | Eteminan et al. | |
| 2012/0102450 A1 | 4/2012 | Choudhary | |

(Continued)

OTHER PUBLICATIONS

Phung Son Lam: "Getting Started with C Programming for the ATMEL AVR Microcontrollers", Apr. 4, 2018, pp. 1-11.

(Continued)

*Primary Examiner* — S. Sough
*Assistant Examiner* — Zheng Wei
(74) *Attorney, Agent, or Firm* — Greenblum & Bernstein, P.L.C.

(57) ABSTRACT

A software development system and method which reduces development cycle times, improves software quality, and indicates speed to market for software is provided. The system integrates development resources to streamline the process of utilizing those resources by a developer or other personnel. A software development workbench and associated toolchain may be used to further improve the software development process.

18 Claims, 6 Drawing Sheets

(56) References Cited

U.S. PATENT DOCUMENTS

| | | | |
|---|---|---|---|
| 2012/0246157 A1 | 9/2012 | Theimer et al. | |
| 2012/0254829 A1 | 10/2012 | Bhalla | |
| 2012/0311534 A1 | 12/2012 | Fox | |
| 2013/0111436 A1* | 5/2013 | Phan | G06F 8/34 |
| | | | 717/113 |
| 2014/0189641 A1 | 7/2014 | Anderson et al. | |
| 2014/0325472 A1 | 10/2014 | Fige et al. | |
| 2016/0292066 A1 | 10/2016 | Stevens et al. | |
| 2019/0212990 A1* | 7/2019 | Kulkarni | G06F 8/34 |
| 2022/0092476 A1* | 3/2022 | Nakanoya | G06N 20/00 |

OTHER PUBLICATIONS

Unknown: "Application Note AT08569: Optimizing ASF Code Size to Minimize Flash and RAM Usage", Jul. 2, 2017, pp. 1-19.
Fylaktopoulos G et al: "An overview of platforms for cloud based development", Jan. 16, 2016, pp. 1-13.
Official Communication Received in European Application No. 19800130.7, dated Jan. 4, 2022.
Barty Burd, "Eclipse For Dummies", published by Wiley Publishing, INc, 2005, ISBN:0-7645-7470-1, p. 1-361 (Year: 2005).
Rellermeyer et al., "Building, Deploying, and Monitoring Distributed Applications with Eclipse and R-OSGi", published by ACM, Eclipse Technology Exchange (ETX) Workshop '07, Oct. 21-25, 2007, pp. 50-54 (Year: 2007).
Official communication (Search Report and Opinion) in W.I.P.O Patent Application No. PCT/US2019/031951, dated Jul. 29, 2019.
Official Communication Received in European Patent Application No. 19800130.7, dated Mar. 16, 2023.

\* cited by examiner

SOFTWARE DEVELOPMENT WORKBENCH

CROSS-REFERENCE TO RELATED APPLICATIONS

This is a continuation application of U.S. patent application Ser. No. 16/410,033, filed May 13, 2019, now U.S. Pat. No. 10,901,731, which claims the benefit of U.S. Provisional Application No. 62/670,444, filed May 11, 2018. The entire disclosure of each of the above-identified applications, including the specification, drawings, and claims, is incorporated herein by reference in its entirety.

TECHNICAL FIELD

The present disclosure generally relates to software development and the process for conception, specification, design, programming, test, and bug resolution for software projects.

BACKGROUND

In the field of software development, reduced cycle times, improved quality, and speed to market are common challenges faced by many technology-focused organizations. Concerns surrounding safety, standards, and security must be taken into account at various stages of development. As software products become more complex, these concerns require more attention from the developer as a project progresses from plan to deployment.

A number of commercial and open source resources have become essential to sound project development. Fully integrating and utilizing these third-party resources with proprietary resources during project development has become tedious and difficult for many developers. Additionally, it has become increasingly important for developers to document and highlight various stages of the development life cycle using available metrics. These added responsibilities increase the complexity of projects and decrease the productivity of developers.

It is therefore appreciated that a need exists for a customizable developer workbench that is capable of facilitating use of multiple tools and metrics in the assistance of the development of software projects.

SUMMARY

In an exemplary embodiment, a system for managing a software development project is provided. The system comprises a software developer workbench comprising: a development toolchain configured to provide access to a plurality of software development tools, wherein the plurality software development tools comprise a code module for writing software code associated with the software development project, a build module for building the software development project, and a test module for testing the software development project; and, a metrics module configured to display one or more metrics associated with the software development project.

In another exemplary embodiment, a method for managing a software development project is provided. The method comprises initializing a software developer workbench comprising: a development toolchain configured to provide access to a plurality of software development tools, wherein the plurality software development tools comprise a code module for writing software code associated with the software development project, a build module for building the software development project, and a test module for testing the software development project; and, a metrics module configured to display one or more metrics associated with the software development project; displaying the software developer workbench on at least one display.

In yet another exemplary embodiment, a non-transitory computer readable medium is having instructions stored thereon is provided. When the instructions are executed by a processor and a memory, causes a processor to: initialize a software developer workbench comprising: a development toolchain configured to provide access to a plurality of software development tools, wherein the plurality software development tools comprise a code module for writing software code associated with the software development project, a build module for building the software development project, and a test module for testing the software development project; and, a metrics module configured to display one or more metrics associated with the software development project.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

Figure 1:
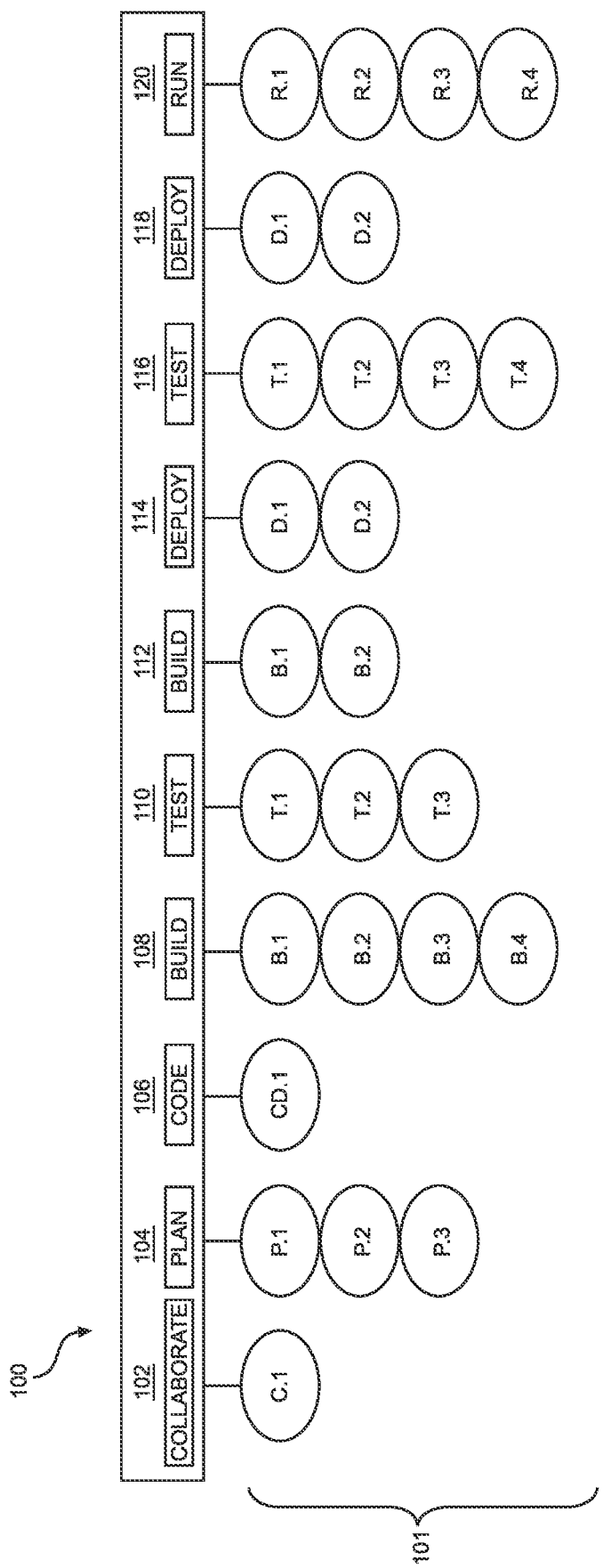
FIG. 1 shows an integrated view of the project development toolchain.

FIG. 1 shows an exemplary project development toolchain 100. Toolchain 100 comprises a plurality of tool modules (e.g. modules 102-120) to assist a developer in the process of creating and maintaining a software project. Tool modules 102-120 may be associated with one or more tools 101 used in Toolchain 100. Tools 101 may be existing Application Program Interfaces (APIs) or data services, or may be user-configured software tools. Toolchain 100 may be comprised of any number of tools 101, and it will be appreciated that the tools described herein are merely illustrative of the types of tools available for a developer to configure as part of the Toolchain 100. It will also be appreciated that the individual tool modules may be made up of a single developer tool or a series of developer tools. Some developer tools may even comprise sub-tools that implement the tool's functionality. Tools 101 may be configured or organized according their associated tool module and/or according to project specifications or user preference.

Toolchain 100 may comprise a plurality of tool modules, for example Collaboration Module 102, Plan Module 104, Code Module 106, Build Modules 108 and 112, Test Modules 110 and 116, Deploy Modules 114 and 118, and Run Module 120. It is appreciated that the Toolchain 100 may comprise different configurations of the various tool modules, including additional or fewer tool modules, depending user preferences, which may be implemented via a user profile. It is further appreciated that the modules of Toolchain 100 can be configured to communicate and transmit data from one module to another. Exemplary tool modules for use with Toolchain 100 will now be described in more detail below.

Collaboration Module 102 comprises at least one developer tool to assist in collaborative aspects of project development. Collaboration Module 102 can be configured to host collaborative interactions such as instant message conversations, screen sharing, and other interactive collaborative activity.

Plan Module 104 comprises at least one developer tool to assist in the planning aspects of project development. Such aspects can include bug tracking, issue tracking, and other project management functions as recognized by one of skill in the art.

Code Module 106 comprises at least one developer tool to assist in the development aspects of project development. Code Module 106 can be configured to communicate with various version control repositories for the management of software projects. It will be appreciated that version control repositories are further operable to pass updated code from Code Module 106 to other modules for use with Toolchain 100. Code Module 106 may also be configured with one or more integrated development environments (IDEs) for the authoring of code for software projects.

Build Modules 108 and 112 comprise at least one developer tool to assist in the build aspects of project development. Build Modules 108 and 112 are configured to build a software project using compilers, debuggers, and other build tools as understood by those of skill in the art. Build Modules 108 and 112 can also be configured to describe the software project, its dependencies on external modules and components, the build order, directories, and required plug-ins. Build Modules 108 and 112 are configured to communicate with Code Module 106 and may be further configured to refer to code repositories for build output and third-party libraries. It is further contemplated that Build Modules 108 and 112 may be configured to configure a build to publish artifacts to third party systems so they may be available to other developers. It is another aspect of Build Modules 108 and 112 that an immutable version of the build may be held before deployment.

Test Modules 110 and 116 comprise at least one developer tool to assist in the testing aspects of project development. Test Modules 110 and 116 are configured to test a software project and identify potential issues such as software bugs, security vulnerabilities, open source code risks, and system load. It is a further aspect of Test Modules 110 and 116 that they be customizable depending on the target environment for the software project.

Deploy Modules 114 and 118 comprise at least one developer tool to assist in the deployment aspects of project development. Deploy Modules 114 and 118 are configured to create, change, or improve the infrastructure of the software project, as well as deploy the software project to its target environment. It is a further aspect of Deploy Modules 114 and 118 that they are configured to receive metrics data from service providers of the target environments.

Run Module 120 comprises at least one developer tool to run the completed software project. It will be appreciated that Toolchain 100 may comprise additional tool modules, for example, one or more tool modules configured to monitor and/or manage applications projects after they have been released. In certain embodiments, additional tool modules may be configured to monitor a run-time state of an application. Additional tools or tool modules could then be used to perform additional collaboration, planning, coding, building, testing, deploying, and/or running activities on the application in view of the run-time state of the application.

Figure 2:
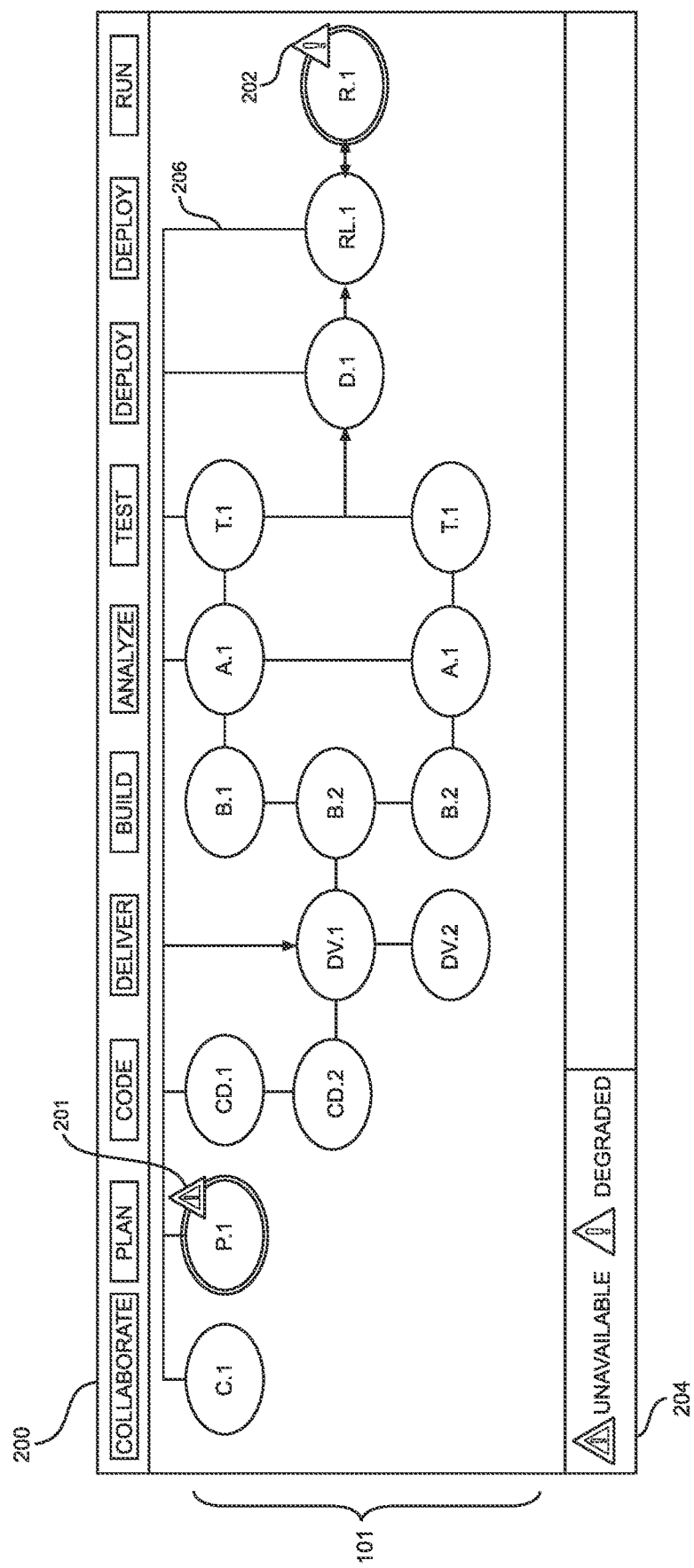
FIG. 2 shows an exemplary implementation of a status indicator of the development toolchain.

In certain embodiments, tools 101 associated with a toolchain may have one or more status indicators as shown with regard to Toolchain 200 in FIG. 2. FIG. 2 shows an exemplary implementation of a status indicator of Toolchain 200. Status Indicators 201 and 202 may serve as a visual indicator of the health or status of a specific tool or tool module associated with Toolchain 200. Status Indicators 201 and 202 are configured to communicate with tools of the Toolchain 200 to determine the operational status of the tool in real time or near real time. Status Indicators 201 and 202 can alert a developer that a specific tool is fully operational, in which case the developer can rely upon the features and benefits of that tool. However, the visual indicator can also indicate to the developer that the tool is offline, and that the features of the tool are not available for use by the developer. The visual indicator may also indicate that a status is unknown. The visual indicator may be used to indicate caution. In this case, the tool is recognized as not fully operational, but some features still may be utilized by the developer. Similarly, the caution indicator will be used when the features of the tool are accessible but degraded. Allowing the developer to visually assess which tools may be suffering from degraded services will assist in troubleshooting issues that arise during development. In known systems, the disparate nature of tools often contributed to project delays when a developer was forced to find alternative tools when a desired tool was down. Toolchain 200 allows for a software developer to quickly assess which tools are available to more easily avoid delays associated with non-operational tools. Status Indicator Legend 204 is configured to provide further information about the visual indicators applied to Status Indicators 200 and 202. In some embodiments, certain tools or tool modules may be linked according to a dependency 206. The dependency 206 may show a relationship between various tools to indicate to a developer that one or more tools necessary to build, test, deploy, and/or run their project are non-operational or are experiencing degraded services. Dependency 206 offers a visual enhancement to Toolchain 200 that enables a developer to more easily avoid delays associated with certain tools or tool modules.

Figure 3:
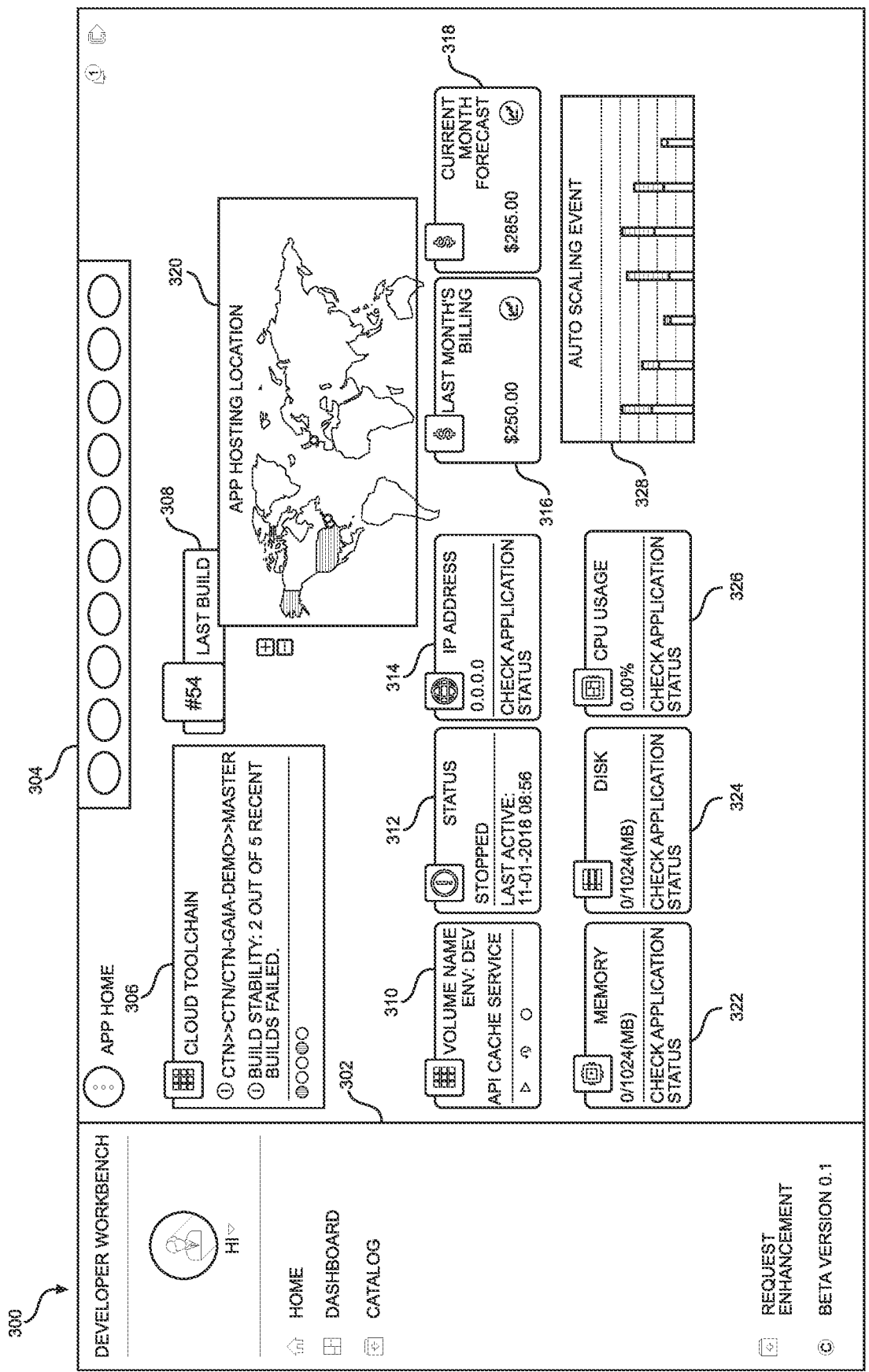
FIG. 3 shows a consolidated view of an exemplary developer workbench.

FIG. 3 shows a consolidated view of an exemplary developer Workbench 300. Workbench 300 is a user-facing interface for the development of a software project. Workbench 300 may comprise a Profile Dashboard 302, a Toolchain Module 304, and at least one Metrics Module. Workbench 300 may be customized according to project parameters or user preference (e.g. according to a user profile). The various components of Workbench 300 are configured to facilitate development of a software project and display useful information about the project to the developer in real time or near real time. In certain embodiments, Workbench 300 may be configured by an organization or business group to encourage or verify use of certain tools and/or metrics in the software development process. In certain embodiments, Workbench 300 may monitor use of the Workbench 300 and generate one or more usage logs relating to a software development project or user of the Workbench 300.

Profile Dashboard 302 displays user and project information. The Profile Dashboard 302 may be further configured to change options and preferences of the user profile, such as which Metrics Modules are displayed, and where each module appears on the dashboard. It is further contemplated that additional Metrics Modules may be selected from a catalog of available Modules. In certain embodiments, the Profile Dashboard 302 remains in view to the user regardless what module or tool is being interacted with.

Toolchain Module 304 is a project development toolchain as described and referenced in FIG. 1. Toolchain Module 304 may comprise a Collaboration Module, Plan Module, Code Module, Build Module, Test Module, Deploy Module, or Run Module, or any combination thereof. Toolchain Module 304 may also have a status indicator for visually indicating the health or status of a tool in the toolchain. Toolchain Metrics Module 306 is configured to analyze and display metrics relating to the Toolchain Module 304. In some embodiments, the tools associated with Toolchain Module 304 may run within Workbench 300. In other embodiments, Toolchain Module 304 may open a separate environment (e.g. a browser window) to operate a desired tool.

Build Metrics Module 308 is configured to analyze and display metrics relating to the specific build of the software project currently loaded to the workbench.

API Cache Service Metrics Module 310 is configured to analyze and display metrics relating to the API Cache Service.

Build Status Module 312 is configured to analyze and display metrics relating to the current status of the build of the software project currently loaded to the workbench.

Network Metrics Modules 314 and 320 are configured analyze and display various network parameters such as connectivity relating to a specified network server or database, connectivity relating to outside resources, network speed, project host location data, and other network parameters as will be recognized by those of skill in the art.

Monetary Metrics Modules 316 and 318 are configured to analyze and display metrics relating to the costs incurred and associated with a certain project. Monetary Metrics Modules 316 and 318 may be configured to communicate with the Toolchain Module 304 to assess charges incurred and associated with use of specific tools. It is also appreciated that the Monetary Metrics may include a forecast of future costs associated with the project.

Computational Resource Metrics Modules 322, 324, and 326 are configured to analyze and display metrics relating to the computational resources used by the project. It is further appreciated that the computational resources measured could relate to a local computer or a network connected computer. Computational Resource Metrics Modules 322, 324, and 326 may be configured to display real-time computational metrics such as CPU usage, memory usage, and disk usage. It is further appreciated that the computational metrics may be actual or simulated values.

Run-time Telemetry Metrics Module 328 is configured to analyze and display metrics relating to run-time telemetry relating to the current software project. As an example, Run-time Telemetry Metrics Module 328 may enable a user to easily assess metrics related to auto-scaling events related to the current software project. It will be appreciated that the various metrics modules illustrated above highlight the ability of Workbench 300 to adapt to a user's needs and requirements related to development of the current software project.

Figure 4:
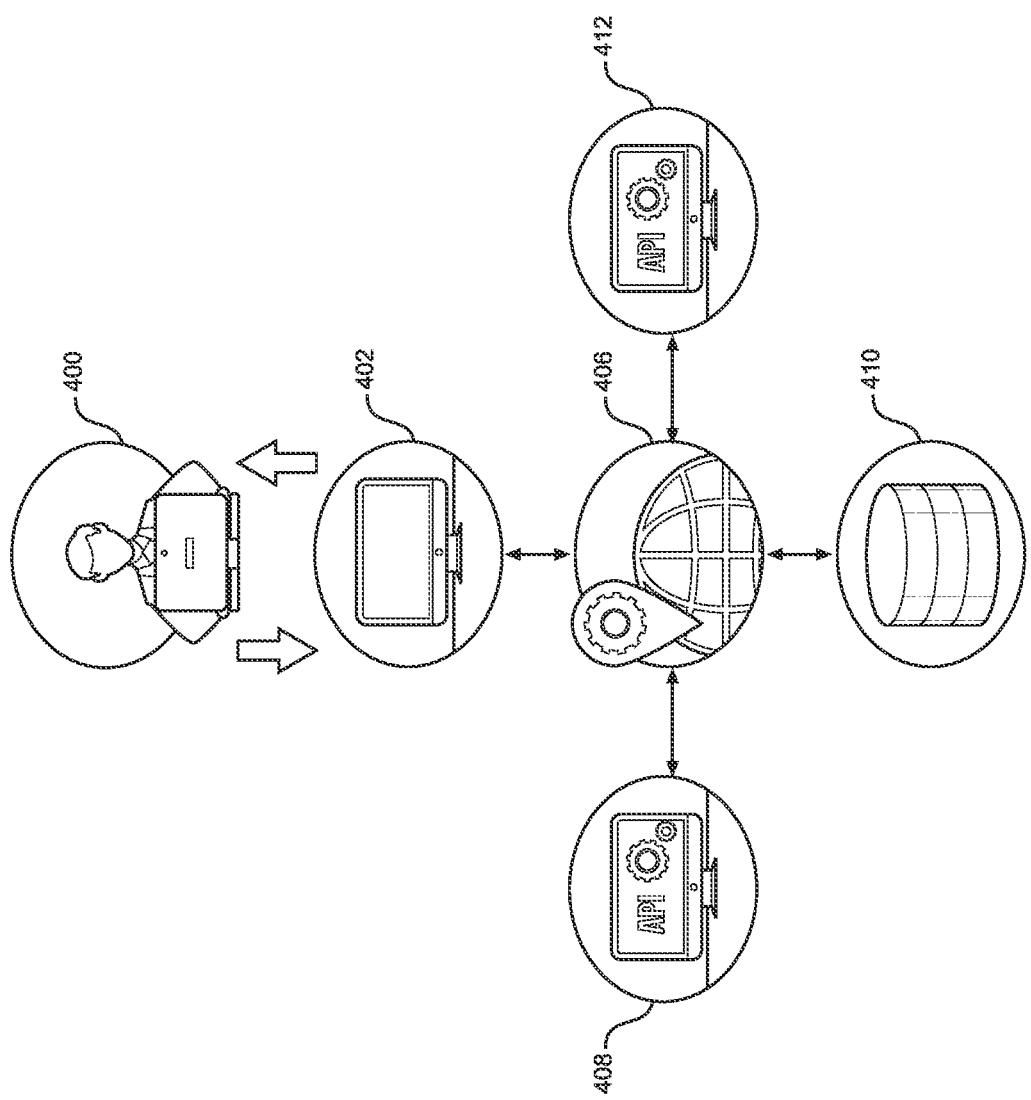
FIG. 4 shows an exemplary implementation of the developer workbench for cloud based project deployment.

FIG. 4 shows an exemplary implementation of the developer workbench for cloud based deployment. In some embodiments, User 400 may interact with the Developer Workbench 402. The Developer Workbench 402 may be configured to interface with the Application Service SpringBoot 406 to communicate with API Data Service 408 and Database 410. After the User 400 authors a software project using the Developer Workbench 402, the Application Service SpringBoot 406 may be configured to deploy the software project to Cloud Platforms 412.

Figure 5:
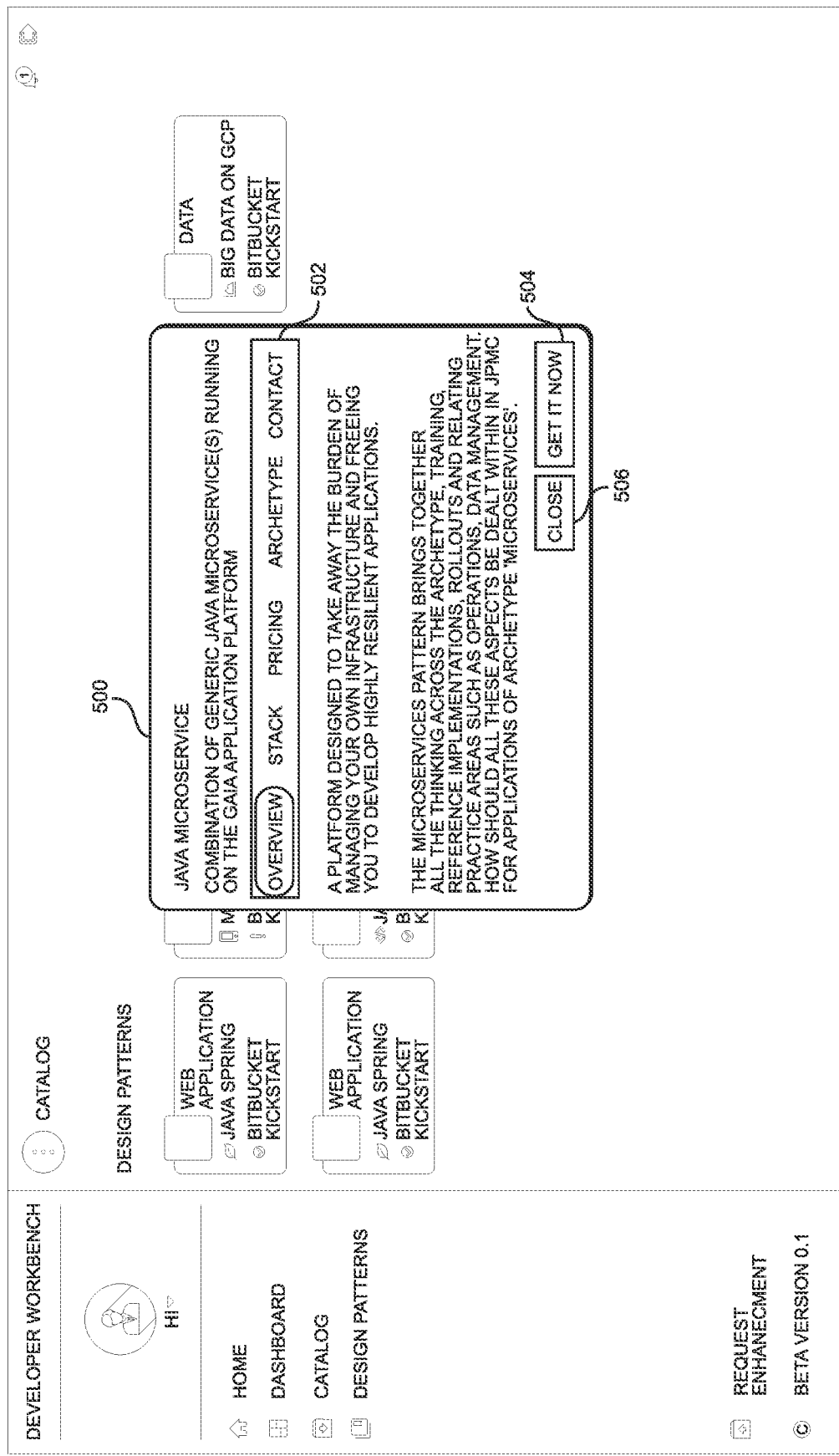
FIG. 5 shows an exemplary view of a user request for a design pattern.

FIG. 5 is illustrative of an exemplary user view of a design pattern 500. Design Pattern 500 includes at least an Information module 502 which can display overview information, stack information, pricing information, archetype information, and contact information relevant to a particular design pattern. Design Pattern 500 also includes at least a "Get it now" button 504 and a "Close" button 506. The "Get it now" button 504 is configured as a one-click deploy service that, when selected by a user, implements features related to a chosen design pattern into the workbench. Design patterns represent the groupings of strategy solutions that compose a combination of strategies which include solutions tailored to the particular needs of an application, provisioning that solution and building the application on that infrastructure. For example, a design pattern may reconfigure the toolchain to incorporate specific tools and/or metrics that may be useful to a project associated with the design pattern. In certain embodiments, a design pattern may be associated with a software project and the selection of a design pattern may trigger a configuration of a workbench, toolchain, and/or metrics modules helpful in development of the associated software project. For example, if a design pattern is used to start a new project, a workbench, toolchain, and/or metrics modules configuration may be automatically applied. If a design pattern is being used in connection with an existing application, the workbench, toolchain, and/or metrics modules may automatically reconfigure based on the design pattern. In some embodiments, after a user has selected a design pattern to use in connection with an existing software project, a notification is generated and displayed to a user to allowing the user to optionally retain their current workbench configuration regardless of the recommended configuration associated with the design pattern.

One of the benefits of design patterns is consistency, as the applications which assert conformance to the design pattern are periodically tested for compatible versions of the product stack. With the growing need for improving developer experience, the "Get it now" button 504 allows users to easily subscribe to an available design pattern and benefit from an accelerated kickstart to their development by deploying a sample application of the pattern in their personal project space with a single click. This is achieved by automating a combination of services provided by different tools and services which are part of the Software Development Life Cycle. The "Close" button 506 is configured to end a user interaction with Design Pattern 500 and return the user to the workbench.

It is further contemplated that design patterns may be extended by allowing the inner-source/open-source community to contribute to different kinds of design patterns of different platforms onto the Workbench. This would help increase the adoption of the design patterns and also raise awareness of the firmwide standards of developing an application on the given platforms.

Figure 6:
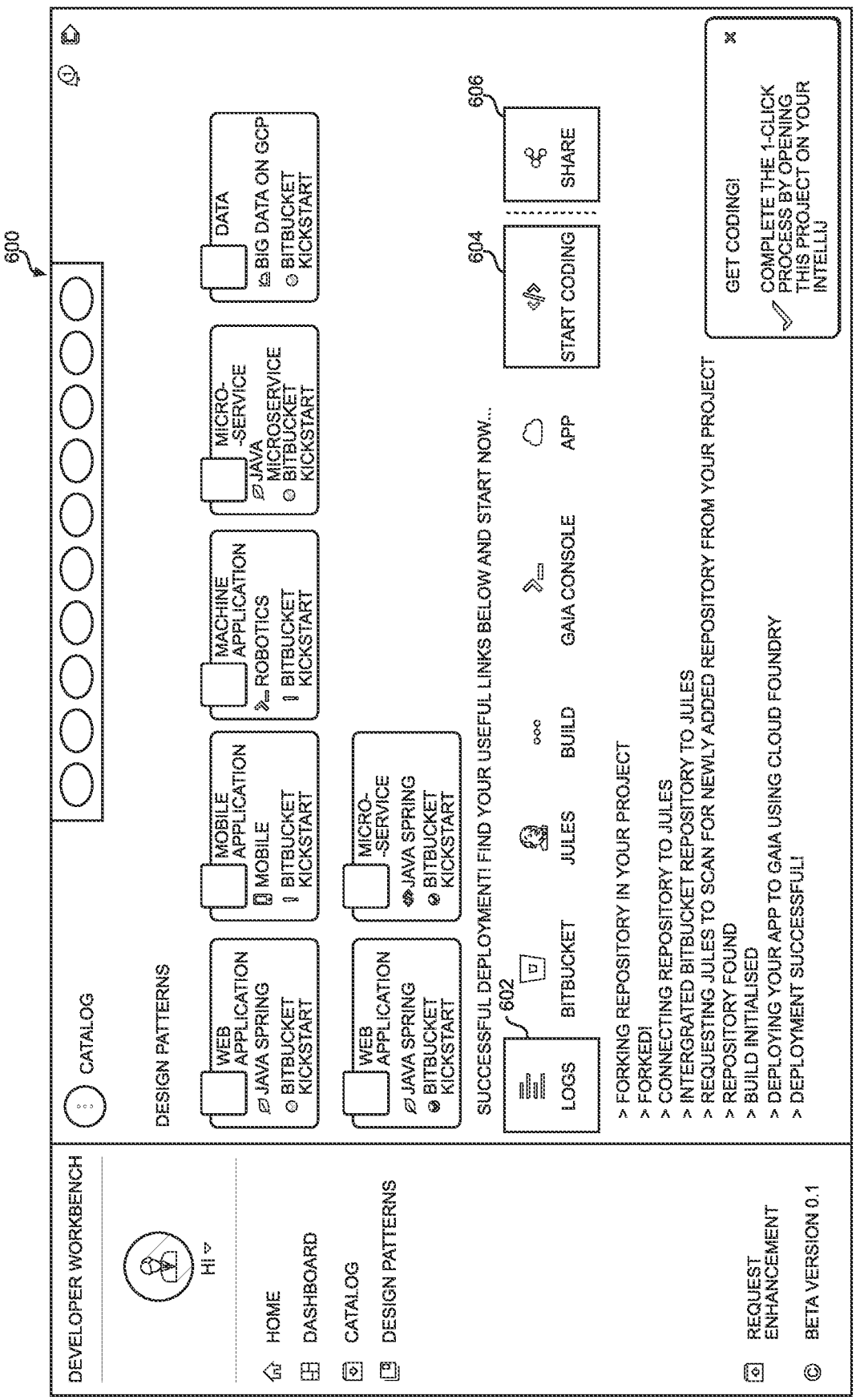
FIG. 6 shows an exemplary view of the developer workbench utilizing a design pattern.

FIG. 6 is view of a post-deployment Workbench 600 where the user has ease of access to the tools which were a part of the one-click deploy process (as shown in FIG. 5) and references to their end state ideally valuable to developers. The Logs and Notifications module 602 is configured to provide log information regarding the deployment of the software project and acts as feedback from the service to the user for improved transparency and traceability to allow them to track back on the process if required. One contemplated post deployment feature is a Start Coding function 604. The Start Coding function 604 would enable a user to instantiate the newly created application project on their local IDE (or a browser-based IDE) and start developing on that codebase instantaneously. Another contemplated post deployment feature would be a Share function 606. The Share function would enable a user to inform other members of the development team of project progress via different communication/collaboration tools and service, such as, but not limited to, Outlook Email, Atlassian Jira, Skype for Business, Mattermost, Symphony Chat, etc. It is appreciated that these and other post-deployment tools may be implemented consistent with the present disclosure. It will be appreciated that use of the post-deployment Workbench 600 may enhance team collaboration, improve user experience, and offer enhanced visibility of toolchain progress.

The term "module" or "engine" used herein will be appreciated as comprising various configurations of computer hardware and/or software implemented to perform operations. In some embodiments, modules or engines as described may be represented as instructions operable to be executed by a processor and a memory. In other embodiments, modules or engines as described may be represented as instructions read or executed from a computer readable media. A module or engine may be generated according to application specific parameters or user settings. It will be appreciated by those of skill in the art that such configurations of hardware and software may vary, but remain operable in substantially similar ways.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

The invention claimed is:

1. A system for managing a software development project, the system comprising:
a processor and a memory, wherein the processor is configured to:
initialize a software developer workbench, wherein the software developer workbench comprising:
a development toolchain configured to provide access to a plurality of software development tools including a plurality of tool modules, wherein the plurality of tool modules comprise a code module for writing software code associated with the software development project, a build module for building the software development project, and a test module for testing the software development project; and
a metrics module configured to display one or more metrics associated with the software development project;
cause at least one display to display the development toolchain including the plurality of tool modules corresponding to the plurality of software development tools;
link the plurality of tool modules of the plurality of software development tools according to a dependency that illustrates a relationship between the plurality of software development tools to indicate to a developer that at least one of the software development tools necessary to build, test, deploy, and/or run the software development project based on the illustrated relationship;
determine operational status of the plurality of software development tools in real time, wherein the operational status includes: fully operational status indicating that features of the plurality of software development tools are available, non-operational status indicating that the features are not available for use, not fully operational status indicating that the features are accessible but degraded, and unknown status; and
cause the at least one display to display visual indicators applied to status indicator corresponding to the determined operational status of the plurality of software development tools.

2. The system according to claim 1, wherein the plurality of development tools further comprise a collaboration module configured to capture and share at least one view of the software developer workbench.

3. The system according to claim 1, wherein the plurality of development tools further comprise a plan module for bug tracking related to the software development project.

4. The system according to claim 1, wherein the the build module compiles at least a portion of the software development project.

5. The system according to claim 1, wherein the plurality of development tools further comprise a deploy module for deploying at least a portion of the software development project to a target environment.

6. The system according to claim 5, wherein the plurality of development tools further comprise a run module for running the software development project in the target environment.

7. The system according to claim 1, wherein the software developer workbench further comprises a profile dashboard configured to access a user profile, wherein the software developer workbench is configured to implement one or more settings associated with the user profile.

8. The system according to claim 7, wherein the software developer workbench is further configured to modify the development toolchain based on the user profile.

9. The system according to claim 1, wherein the metrics module is further configured to analyze and display metrics relating to computational resources used by the software development project.

10. A method for managing a software development project, the method comprising:
initializing a software developer workbench, wherein the software developer workbench comprising:
a development toolchain configured to provide access to a plurality of software development tools including a plurality of tool modules, wherein the plurality of tool modules comprise a code module for writing software code associated with the software development project, a build module for building the software development project, and a test module for testing the software development project; and a metrics module configured to display one or more metrics associated with the software development project;

displaying the development toolchain including the plurality of tool modules corresponding to the plurality of software development tools on at least one display;

linking the plurality of tool modules of the plurality of software development tools according to a dependency that illustrates a relationship between the plurality of software development tools to indicate to a developer that at least one of the software development tools necessary to build, test, deploy, and/or run the software development project based on the illustrated relationship;

determining operational status of the plurality of software development tools in real time, wherein the operational status includes: fully operational status indicating that features of the plurality of software development tools are available, non-operational status indicating that the features are not available for use, not fully operational status indicating that the features are accessible but degraded, and unknown status; and displaying on the at least one display visual indicators applied to status indicator corresponding to the determined operational status of the plurality of software development tools.

11. The method according to claim 10, further comprising:
capturing and sharing at least one view of the software developer workbench by a collaboration module of the plurality of development tools.

12. The method according to claim 10, further comprising:
tracking bug related to the software development project by a plan module of the plurality of development tools.

13. The method according to claim 10, further comprising:
compiling at least a portion of the software development project by the build module.

14. The method according to claim 10, further comprising:
deploying at least a portion of the software development project to a target environment by a deploy module of the plurality of development tools.

15. The method according to claim 10, further comprising:
running the software development project in a target environment by a run module of the plurality of development tools.

16. The method according to claim 10, further comprising:
accessing a user profile, and implementing one or more settings associated with the user profile by a profile dashboard of the software developer workbench.

17. The method according to claim 16, further comprising:
modifying the development toolchain based on the user profile by the software developer workbench.

18. A non-transitory computer readable medium having instructions stored thereon, such that when the instructions are executed by a processor and a memory, cause the processor to:

initialize a software developer workbench, wherein the software developer workbench comprising:

a development toolchain configured to provide access to a plurality of software development tools including a plurality of tool modules, wherein the plurality of tool modules comprise a code module for writing software code associated with the software development project, a build module for building the software development project, and a test module for testing the software development project; and, a metrics module configured to display one or more metrics associated with the software development project;

cause at least one display to display the development toolchain including the plurality of tool modules corresponding to the plurality of software development tools;

link the plurality of tool modules of the plurality of software development tools according to a dependency that illustrates a relationship between the plurality of software development tools to indicate to a developer that at least one of the software development tools necessary to build, test, deploy, and/or run the software development project based on the illustrated relationship;

determine operational status of the plurality of software development tools in real time, wherein the operational status includes: fully operational status indicating that features of the plurality of software development tools are available, non-operational status indicating that the features are not available for use, not fully operational status indicating that the features are accessible but degraded, and unknown status; and cause the at least one display to display visual indicators applied to status indicator corresponding to the determined operational status of the plurality of software development tools.

* * * * *